United States Patent [19]

Pidgeon et al.

[11] 4,443,792

[45] Apr. 17, 1984

[54] ELECTROMAGNETIC POSITION DETECTOR EMPLOYING FAST FOURIER TRANSFORM ANALYSIS

[75] Inventors: Brian G. Pidgeon; Clive R. Bavington, both of Burton-on-Trent, England

[73] Assignee: Coal Industry (Patents) Limited, London, England

[21] Appl. No.: 291,884

[22] Filed: Aug. 11, 1981

[30] Foreign Application Priority Data

Aug. 29, 1980 [GB] United Kingdom ................ 8027952

[51] Int. Cl.³ .............................................. G08B 21/00
[52] U.S. Cl. .................................... 340/612; 340/552; 343/5 FT; 343/5 PD
[58] Field of Search ............... 340/552, 612, 617, 618; 343/5 PD, 5 FT

[56] References Cited

U.S. PATENT DOCUMENTS

| 3,680,074 | 7/1972 | Lieser | 343/5 PD |
|---|---|---|---|
| 3,703,722 | 11/1972 | Gershberg et al. | 343/5 PD |
| 3,967,283 | 6/1976 | Clark et al. | 343/5 PD |
| 4,222,050 | 9/1980 | Kiuchi et al. | 343/5 FT |
| 4,319,332 | 3/1982 | Mehnert | 343/5 PD |

Primary Examiner—Glen R. Swann, III
Attorney, Agent, or Firm—James Creighton Wray

[57] ABSTRACT

A high frequency signal is beamed into a bunker and a reflected signal from the top of the contents in the bunker is detected and fed into electronic circuitry. This circuitry obtains a beat signal dependent in frequency on the height of material in the bunker and the signal is subjected to division in a processing circuit and subsequent treatment as a Fast Fourier transform. A store gathers all divided and transformed segments of the signal to provide a spectrum from which the level of the bunker can be obtained as a read out.

4 Claims, 4 Drawing Figures

ELECTROMAGNETIC POSITION DETECTOR EMPLOYING FAST FOURIER TRANSFORM ANALYSIS

BACKGROUND OF THE INVENTION

This invention relates to a method and apparatus for determining the position of an object in a confined space.

The invention finds particular but not exclusive application in determining the contents of a bunker or silo by measuring the position of the top of the contents. It will be appreciated that the contents may be in the form of particulate solids or a liquid form. The invention is, however, not limited to this application and may be used for other purposes such as, for example, determining the position of a train in a tunnel or locating the position of an intruder in a room where a security situation is being monitored.

The invention operates on the well known radar principle of projecting a beam of high frequency radiation at an object, collecting the reflected signal and analysing the time delay to give a determination of the position of the object. One example of the application of this method to measure the contents of a bunker is disclosed in British Patent Application No. 2,020,507A.

The general application of the radar principle gives rise to many problems in practice, particularly those associated with variations in aperture and frequency components where the surface of the object being monitored is continually moving. For example, in a bunker which has been fed with particulate or liquid material there may be a spread of material across the surface which gives a constantly varying uneven surface. The radar may also be confused by material falling across the path of the beam. Errors may also be introduced due to a constant reflection from a projection such as a support within the bunker or standing waves can become a problem in any microwave system connecting the radar aerial to the microwave source.

SUMMARY OF THE INVENTION

It is an object of the present invention to provide an improved method and apparatus which enables these diversions to be reduced and to give a more accurate determination of position than has hitherto been possible. According to the first aspect of the present invention a method of locating the position of an object in a confined space includes the steps of emitting a high frequency signal into a space, receiving at or adjacent the point of emitting the signal a reflection of the high frequency signal, mixing the received signal with the emitted signal to obtain a beat signal, dividing in a processing circuit the beat signal into a plurality of segments, subjecting each segment to a Fast Fourier Transform, obtaining a computed discrete frequency spectrum of the transform, storing said spectrum and summing a consecutive plurality of the spectra to give an indication of the position of the object in the space.

The invention may also include the step of storing a first discrete frequency spectrum and comparing this with a later spectrum to give a validity test of later and subsequent spectra.

The plurality of segments monitored to give the indication is preferably at least 5, although it will be understood that the more segments which are compared the more accurate the indication. However, a balance will have to be achieved between the speed at which the spectra are obtained and the rate of movement of the object being monitored.

Preferably the mixed signal is subjected to a preamplifying and filtering operation to remove spurious information and to amplify the wanted parameters from the information received.

According to another aspect of the present invention an apparatus for locating the position of an object in a confined space comprises a generator for feeding a high frequency signal to a transmitter aerial, receiving means for receiving a reflection of the signal from an object in a confined space, a circulator for combining the emitted and received signals and processing apparatus adapted to segment a beat frequency obtained from the circulator and to subject it to a Fast Fourier Transform, to summate a consecutive plurality of segments of information subjected to said Transform and to give an indication of the result of said summation. The processor may give the indication on indication means which are integral with or remote from the processor. A filter means may be included in the processing apparatus in order to remove spurious signals fed to the processor. It may also be advantageous to include between the filter means and the processing elements of the processor an analogue-to-digital conversion device. The processor can conveniently be a microprocessor. In order that the invention may be readily understood one example of the apparatus in accordance therewith and including the method thereof will now be described with reference to the four figures of the accompanying drawings.

BRIEF DESCRIPTION OF THE DRAWINGS

In the figures.

DETAILED DESCRIPTION OF THE INVENTION

Figure 1:
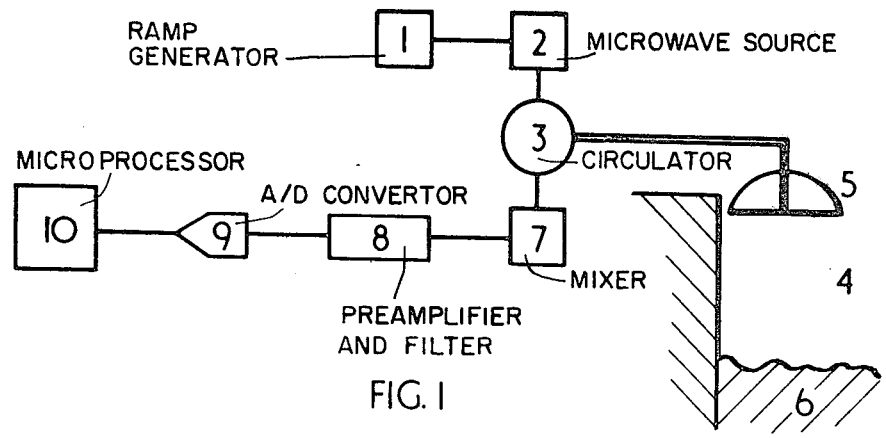
FIG. 1 is a schematic showing the general layout of the apparatus.

Referring first to FIG. 1 of the drawing, a ramp generator 1 together with a microwave source 2 comprises a microwave transmitter with a centre frequency in the SHF band. The wave band may, in certain applications, be in a VHF or UHF band. This transmits a high frequency electromagnetic wave to a circulator 3 where the principle part of the wave is fed to a vertical bunker 4 whose contents are being monitored by observing the position of the surface of the contents of the bunker. A directional form of, typically parabolic, antenna 5 is situated at the open top of the bunker and beams the high frequency radiation onto the surface of the material 6 in the bunker 4. The energy of the beam is concentrated into a narrow beam width to ensure as unobstructed a path as possible. Some of the signal beam is reflected from the surface of material 6 back to the antenna 5 where it is retransmitted to the circulator 3.

Figure 2:
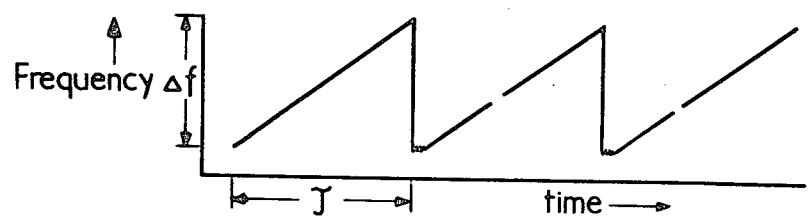
FIGS. 2, 3 and 4 are wave diagrams explaining the operation of the apparatus.

From the circulator 3 the reflected wave is transmitted to a mixer 7 where it is mixed with some of the original wave which had been allowed to leak into the mixer 7 as a reference signal. The original signal is indicated in its wave form in FIG. 2 where it will be seen that the signal is of a general triangular form having a frequency excursion $\Delta F$ and a frequency time period $\tau$. The output of mixer 7 is fed into a preamplifier and filter 8 which in turn feeds into an analogue-to-digital converter 9 whose output is connected to a microprocessor 10 including an integral display unit.

Figure 3:
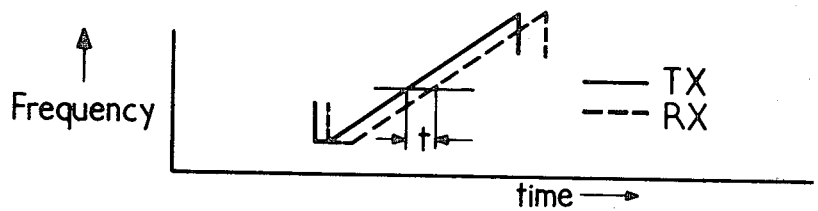
Figure 4:
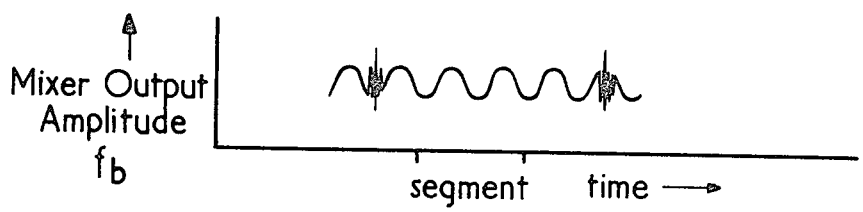

In operation the high frequency signal is constantly emitted from the antenna 5 onto the surface of the material 6. This surface can be constantly changing as material is withdrawn from the bottom of the bunker and is fed into it from the top. The reflected signal may therefore be constantly changing too and if attention is now paid to FIG. 3 the transmitted signal TX can be seen to be displaced from the reflected signal RX by an element t. This gives rise to the beat frequency $f_b$. This is further illustrated in FIG. 4 where output of the mixer is shown on the ordinate.

The relationship between the beat frequency and the distance d between the antenna and the surface can be derived from the equation $f_b = (2\Delta F/c)(d/\tau)$ in which C = velocity of light $3 \times 10^8$ m/sec.

In this example the beat frequency $f_b$ passes through the preamplifier part of 8 which is a 20 db/decade frequency response to provide automatic gain control and a filter which filters out unwanted frequencies such as those caused by standing waves. The filtered and amplified signal is then digitised by an analogue-to-digital converter 9 and passed to the microprocessor 10.

In the microprocessor a segment of data is selected and is transformed using a Fast Fourier Transform. This Transform results in a compared discrete frequency spectrum which is then stored in a memory of the microprocessor. A sequential segment of data is then located and similarly treated. Two spectra are summated and the process is repeated until in this example 5 segments have been analysed and their spectra summated. The position of the surface of material 6 is then calculated from the frequency peak in the summated spectra and is subjected to a validity test before being presented on the indicator as to the true position of the surface.

The validity test is used to check the calculated position of the surface being compared to with previous calculated positions. This ensures that if a spurious set of signals have been introduced by a sudden movement of material across the path of the beam, a wrong indication is not given. Assuming that no negative information is received from the validity test the indicator will give a correct indication of the average position of the object, also signals obtained by reflection from permanent structures within the bunker will be eliminated.

In the present example the information was updated every 10 seconds on segments of information summated in batches of 5. In other installations, depending on the response time of the components of the apparatus, the display can be updated more or less frequently. For example, if the position of a train in a tunnel was needed it may be essential that the update is done on a second by second basis.

The invention enables the position of an object such as the surface of material in a bunker to be constantly monitored and for the necessary corrections and alterations to any overall system in which the apparatus is being used to be applied swiftly.

We claim:

1. A method of locating the position of an object in a confined space including the steps of creating a high frequency microwave signal, repeatedly varying the frequency of the signal, emitting the repeatedly varied high frequency microwave signal from a relatively stationary source into a confined space, receiving at or adjacent the point of emission of the signal a reflection of the high frequency signal, mixing the received signal with the emitted signal to obtain a beat signal, dividing in a processing circuit the beat signal into a plurality of segments, subjecting each segment to a fast Fourier transform, obtaining a computed discrete frequency spectrum of the transform of each segment, storing said spectrum and summing a consecutive plurality of the spectra, and calculating the position of the object in the space based on said summed spectra, testing validity of the calculated position of the object by comparing the calculated position with previous calculated positions and preventing a wrong indication, and giving a correct indication of average position of the object when no negative information is received from the validity testing.

2. A method as claimed in claim 1 in which the plurality of segments monitored to give the indication is at least 5.

3. A method as claimed in claim 1 and including subjecting the mixed signal to a preamplifying and filtering operation to remove spurious information and to amplify the wanted parameters from the information received.

4. Apparatus for locating the position of an object in a confined space comprising a generator for feeding a high frequency microwave signal to a relatively stationary transmitter aerial, receiving means for receiving a reflection of the signal from the confined space, a circulator for combining the emitter and received signals and processing apparatus adapted to segment a beat frequency obtained from the circulator, to subject it to a fast Fourier transform, to summate a consecutive plurality of segments of information subjected to said transform, and to calculate position of the object in the space based upon said result, means for testing validity of the calculated position of the object by comparing the calculated position with previous calculated positions and preventing a wrong indication, and means for giving a correct indication of average position of the object when no negative information is received from the validity testing means.

* * * * *